United States Patent
Conn

(10) Patent No.: US 12,237,971 B2
(45) Date of Patent: Feb. 25, 2025

(54) SYSTEMS AND METHODS FOR INITIATING OVER-THE-AIR PROGRAMMING OF TRANSMISSION CONTROL MODULE

(71) Applicant: Allison Transmission, Inc., Indianapolis, IN (US)

(72) Inventor: Randall S. Conn, Avon, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 114 days.

(21) Appl. No.: 15/958,009

(22) Filed: Apr. 20, 2018

(65) Prior Publication Data

US 2019/0327131 A1    Oct. 24, 2019

(51) Int. Cl.
*H04L 41/082* (2022.01)
*F16H 61/00* (2006.01)
*F16H 61/02* (2006.01)
*H04L 67/55* (2022.01)

(52) U.S. Cl.
CPC ....... *H04L 41/082* (2013.01); *F16H 61/0213* (2013.01); *H04L 67/55* (2022.05); *F16H 2061/0053* (2013.01)

(58) Field of Classification Search
CPC .................. H04L 41/082; H04L 67/26; F16H 2061/0062; F16H 61/0213
See application file for complete search history.

(56) References Cited

U.S. PATENT DOCUMENTS

| | | |
|---|---|---|
| 7,499,784 B2 | 3/2009 | Kresse |
| 8,000,864 B2 | 8/2011 | Rains |
| 8,170,758 B2 | 5/2012 | Rains |
| 8,332,108 B2 | 12/2012 | Kresse et al. |
| 8,935,068 B2 | 1/2015 | Kresse et al. |

(Continued)

FOREIGN PATENT DOCUMENTS

| | | |
|---|---|---|
| CN | 202156303 U | 3/2012 |
| CN | 103296633 A | 9/2013 |

(Continued)

OTHER PUBLICATIONS

International Search Report and Written Opinion of the International Searching Authority for PCT/US2019/028130, Korean Intellectual Property Office/International Application Division, Aug. 7, 2019, 10 pages.

*Primary Examiner* — Nam T Tran
(74) *Attorney, Agent, or Firm* — Faegre Drinker Biddle & Reath LLP

(57) ABSTRACT

Disclosed herein are systems and methods for initiating over-the-air (OTA) programming (together, OTAP) of a transmission control module (TCM) of a vehicle. In an embodiment, a TCM determines that an OTAP update is available, and responsively presents an update-ready indication via an operator interface of the vehicle, and thereafter determines whether each precondition in a set of one or more preconditions is satisfied, including a precondition that a valid initiate-update instruction has been received via the operator interface. If the TCM determines that each precondition in the set is satisfied, the TCM then responsively initiates installation of the OTAP update. If, however, the TCM determines that at least one precondition in the set is not satisfied, the TCM then responsively does not initiate installation of the OTAP update.

24 Claims, 9 Drawing Sheets

(56) References Cited

U.S. PATENT DOCUMENTS

| | | | |
|---|---|---|---|
| 9,365,201 B2 | 6/2016 | Shattuck et al. | |
| 9,512,905 B2 | 12/2016 | Muller et al. | |
| 9,518,638 B2 | 12/2016 | Muller et al. | |
| 9,541,168 B2 | 1/2017 | Muller et al. | |
| 9,625,007 B2 | 4/2017 | Long et al. | |
| 9,631,707 B2 | 4/2017 | Muller et al. | |
| 9,722,781 B2* | 8/2017 | Smereka | H04L 67/34 |
| 9,726,256 B2 | 8/2017 | Muller et al. | |
| 9,916,151 B2* | 3/2018 | Ye | H04W 12/10 |
| 10,353,695 B2* | 7/2019 | Endo | H04L 67/04 |
| 2009/0216414 A1* | 8/2009 | Rains | F16H 61/0202 701/55 |
| 2009/0300595 A1 | 12/2009 | Moran et al. | |
| 2011/0320089 A1* | 12/2011 | Lewis | H04W 12/04 701/29.6 |
| 2012/0258725 A1 | 10/2012 | Yi et al. | |
| 2013/0022642 A1 | 1/2013 | Park et al. | |
| 2013/0226422 A1* | 8/2013 | Moses | B60T 8/175 701/70 |
| 2013/0232478 A1 | 9/2013 | Jeon | |
| 2015/0178061 A1* | 6/2015 | Wang | G06F 8/61 717/172 |
| 2015/0292615 A1 | 10/2015 | Shattuck et al. | |
| 2016/0025213 A1 | 1/2016 | Etchason | |
| 2016/0040754 A1 | 2/2016 | Schoolcraft | |
| 2016/0138680 A1 | 5/2016 | Schoolcraft | |
| 2016/0138681 A1 | 5/2016 | Schoolcraft | |
| 2016/0138682 A1 | 5/2016 | Schoolcraft | |
| 2016/0170775 A1 | 6/2016 | Rockwell et al. | |
| 2016/0266886 A1 | 9/2016 | Sarkar et al. | |
| 2017/0123784 A1 | 5/2017 | Zymeri et al. | |
| 2017/0213034 A1 | 7/2017 | Sarangdhar et al. | |
| 2018/0031119 A1 | 2/2018 | Maurer et al. | |
| 2018/0039489 A1 | 2/2018 | Shiraishi et al. | |
| 2018/0107473 A1 | 4/2018 | Ahmed et al. | |
| 2019/0187971 A1* | 6/2019 | Wang | H04L 67/34 |
| 2019/0212997 A1* | 7/2019 | Sangameswaran | H04L 67/12 |
| 2019/0258466 A1* | 8/2019 | Mitchell | H04L 67/34 |

FOREIGN PATENT DOCUMENTS

| | | |
|---|---|---|
| CN | 105387406 A | 3/2016 |
| CN | 105653431 A | 6/2016 |
| CN | 106030525 A | 10/2016 |
| CN | 106648748 A | 5/2017 |
| CN | 106789379 A | 5/2017 |
| CN | 106874026 A | 6/2017 |
| JP | 2001-273128 A | 10/2001 |

* cited by examiner

SYSTEMS AND METHODS FOR INITIATING OVER-THE-AIR PROGRAMMING OF TRANSMISSION CONTROL MODULE

FIELD OF THE DISCLOSURE

The present disclosure relates generally to transmission control modules (TCMs) for vehicles, and more specifically to techniques of approving and thereby triggering installation of over-the-air (OTA) programming (together, OTAP) updates with respect to configuration settings, firmware, software, and the like of such TCMs.

BACKGROUND OF THE DISCLOSURE

Numerous companies and other organizations in this day and age maintain fleets of vehicles, where typically each such vehicle includes an automatic transmission that is controlled by an onboard unit that is known in the art as a TCM and by other names, such as transmission control system, transmission controller, and the like. With respect to each such vehicle, the respective TCM is typically operable to execute instructions for controlling the associated automatic transmission using any combination of software, firmware, and hardware deemed suitable by those of skill in the art for a given implementation. Furthermore, each respective TCM is typically operable to store and operate according to current values of any number of configuration settings.

SUMMARY

Disclosed herein are systems and methods for initiating OTAP (e.g., OTA updating) of a TCM.

One embodiment takes the form of a method that includes an onboard system of a vehicle. The onboard system includes a TCM that itself includes a communication interface, a processor, and a non-transitory computer-readable medium (CRM) containing instructions executable by the processor for causing the TCM to carry out a set of TCM functions. According to this embodiment, the set of TCM functions includes determining that an OTAP update is available, and responsively presenting an update-ready indication via an operator interface of the vehicle. The set of TCM functions further includes, after presenting the update-ready indication, determining whether each precondition in a set of one or more preconditions is satisfied. The set of one or more preconditions includes a first precondition that a valid initiate-update instruction has been received via the operator interface. The set of TCM functions also includes, if the TCM determines that each precondition in the set of one or more preconditions is satisfied, the TCM then responsively initiating installation of the OTAP update, and if the TCM determines that at least one precondition in the set of one or more preconditions is not satisfied, the TCM then responsively not initiating installation of the OTAP update.

Another embodiment takes the form of a method carried out by a TCM, where the method includes the TCM functions listed in the preceding paragraph.

Moreover, any of the variations and permutations described herein can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and/or characterize such embodiments.

In at least one embodiment, the OTAP update includes an update to firmware of the TCM.

In at least one embodiment, the OTAP update includes an update to software of the TCM.

In at least one embodiment, the OTAP update includes an update to one or more configuration settings of the TCM.

In at least one embodiment, determining that the OTAP update is available includes receiving the OTAP update from a network-side entity via a wireless data connection.

In at least one embodiment, the update-ready indication includes one or more of a visible indication, an audible indication, and a tactile indication.

In at least one embodiment, presenting the update-ready indication includes flashing a check-transmission light of the operator interface.

In at least one embodiment, the operator interface includes an ignition switch having at least an OFF position and an ON position; the set of TCM functions further includes monitoring a current position of the ignition switch; and the set of one or more preconditions further includes a second precondition that the current position of the ignition switch is the ON position.

In at least one embodiment, the vehicle includes a prime mover having at least a RUNNING state and a NOT-RUNNING state; the set of TCM functions further includes monitoring a current state of the prime mover; and the set of one or more preconditions further includes a third precondition that the current state of the prime mover is the NOT-RUNNING state.

In at least one embodiment, the operator interface includes a shift selector having a plurality of shift-selector positions; the set of TCM functions further includes monitoring for receipt of any sequences of shift-selector-position inputs via the operator interface; and determining whether the first precondition is satisfied includes: receiving a given sequence of shift-selector-position inputs; comparing the received sequence of shift-selector-position inputs to a prestored sequence of shift-selector-position inputs; determining that the first precondition is satisfied if the given sequence of shift-selector-position inputs matches the prestored sequence of shift-selector-position inputs; and determining that the first precondition is not satisfied if the given sequence of shift-selector-position inputs does not match the prestored sequence of shift-selector-position inputs.

In at least one such embodiment, the set of TCM functions further includes receiving a change-prestored-sequence instruction to replace the prestored sequence of shift-selector-position inputs with a different sequence of shift-selector-position inputs, and responsively replacing the prestored sequence with the different sequence. In at least one such embodiment, receiving the change-prestored-sequence instruction includes receiving the change-prestored-sequence instruction via the operator interface. In at least one other such embodiment, receiving the change-prestored-sequence instruction includes receiving the change-prestored-sequence instruction from a network-side entity via a wireless data connection.

In at least one embodiment, the operator interface includes a touchscreen; presenting the update-ready indication via the operator interface includes presenting the update-ready indication via the touchscreen; and determining whether the first precondition is satisfied includes: determining that the first precondition is satisfied if a confirmation input associated with the presented update-ready indication is received via the operator interface; and determining that the first precondition is not satisfied if a confirmation input associated with the presented update-ready indication is not received via the operator interface.

In at least one embodiment, the set of TCM functions further includes determining that the OTAP update has been successfully installed, and responsively presenting via the operator interface an indication of successful installation. In at least one such embodiment, presenting the indication of successful installation includes flashing a check-transmission light of the operator interface.

Another embodiment takes the form of an onboard system of a vehicle. The onboard system includes a TCM that itself includes a communication interface, a processor, and a non-transitory CRM containing instructions executable by the processor for causing the TCM to carry out a set of TCM functions. According to this embodiment, the set of TCM functions includes determining that each precondition in a set of one or more preconditions is satisfied, the set of one or more preconditions including a first precondition that an OTAP update has been successfully downloaded to the TCM, and responsively presenting an update-ready indication via an operator interface of the vehicle; after presenting the update-ready indication, receiving an input via the operator interface and responsively determining whether the received input is a valid initiate-update instruction; if the TCM determines that the received input is a valid initiate-update instruction, the TCM then responsively initiating installation of the OTAP update; and if the TCM determines that the received input is not a valid initiate-update instruction, the TCM then responsively not initiating installation of the OTAP update.

In at least one embodiment, the operator interface includes an ignition switch having at least an OFF position and an ON position; the set of TCM functions further includes monitoring a current position of the ignition switch; and the set of one or more preconditions further includes a second precondition that the current position of the ignition switch is the ON position.

In at least one embodiment, the vehicle includes a prime mover having at least a RUNNING state and a NOT-RUNNING state; the set of TCM functions further includes monitoring a current state of the prime mover; and the set of one or more preconditions further includes a third precondition that the current state of the prime mover is the NOT-RUNNING state.

In at least one embodiment, the operator interface includes a shift selector having a plurality of shift-selector positions; the set of TCM functions further includes monitoring for receipt of any sequences of shift-selector-position inputs via the operator interface; and determining whether the received input is a valid initiate-update instruction includes: receiving a given sequence of shift-selector-position inputs; comparing the received sequence of shift-selector-position inputs to a prestored sequence of shift-selector-position inputs; determining that the received input is a valid initiate-update instruction if the given sequence of shift-selector-position inputs matches the prestored sequence of shift-selector-position inputs; and determining that the received input is not a valid initiate-update instruction if the given sequence of shift-selector-position inputs does not match the prestored sequence of shift-selector-position inputs.

In at least one embodiment, the operator interface includes a touchscreen; presenting the update-ready indication via the operator interface comprises presenting the update-ready indication via the touchscreen; and determining whether the received input is a valid initiate-update instruction includes: determining that the received input is a valid initiate-update instruction if a confirmation input associated with the presented update-ready indication is received via the operator interface; and determining that the received input is not a valid initiate-update instruction if a confirmation input associated with the presented update-ready indication is not received via the operator interface.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION OF THE DRAWINGS

I. Foreword

Figure 1:
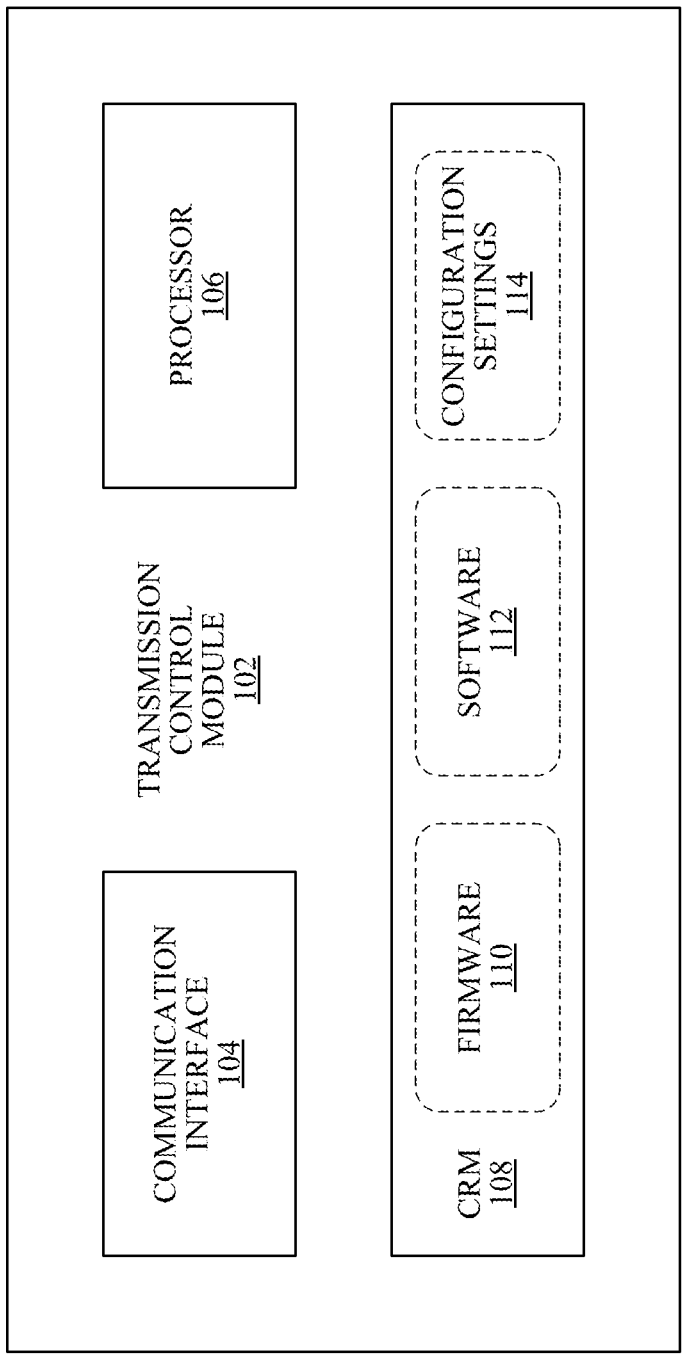
FIG. 1 is a simplified functional block diagram of an example transmission control module (TCM), in accordance with at least one embodiment.

For the purposes of promoting an understanding of the principles of the present disclosure, reference is made below to the embodiments illustrated in the drawings, which are described below. The embodiments disclosed below are not intended to be exhaustive or to limit the present disclosure to the precise form disclosed in the following detailed description. Rather, the embodiments are chosen and described so that others skilled in the art may utilize their teachings. Therefore, no limitation of the scope of the present disclosure is thereby intended.

In some instances throughout this disclosure and in the claims, numeric modifiers such as first, second, third, and fourth are used in reference to various components, data such as various identifiers, and/or other elements. Such use is not intended to denote or dictate a specific or required order of the elements. Rather, this numeric terminology is used to assist the reader in identifying the element that is being referenced and in distinguishing that element from other elements, and should not be narrowly interpreted as insisting upon a specific order of elements.

Moreover, before proceeding with the detailed description, it is noted that the entities, arrangements, and the like that are depicted in—and described in connection with—the various drawings are presented by way of example and not by way of limitation. As such, any and all statements or other indications as to what a particular drawing "depicts," what a particular element or entity in a particular drawing "is" or "has," and any and all similar statements—that could in isolation and out of context be read as absolute and therefore limiting—can only properly be read as being constructively (unless actually) preceded by a clause such as "In at least one embodiment, . . . ." And it is for reasons akin to brevity and clarity of presentation that this implied leading clause is not repeated ad nauseum in this detailed description.

Furthermore, in the present disclosure, it may be the case that various elements of one or more of the described embodiments are referred to as "modules" that carry out (i.e., perform, execute, and the like) various functions described herein. If and when the term "module" is used herein, each described module includes hardware (e.g., one or more processors, one or more microprocessors, one or more microcontrollers, one or more microchips, one or more application-specific integrated circuits (ASICs), one or more field programmable gate arrays (FPGAs), one or more memory devices, and/or one or more of any other type or types of devices and/or components deemed suitable by those of skill in the relevant art in a given context and/or for a given implementation.

Each described module also includes instructions executable by said hardware for carrying out the one or more functions described herein as being carried out by the particular module, where those instructions could take the form of hardware (i.e., hardwired) instructions, firmware instructions, software instructions, and/or the like, stored in any non-transitory computer-readable medium (CRM) deemed suitable by those of skill in the relevant art in a given context and/or for a given implementation. A non-transitory CRM, or memory, may include random access memory (RAM), read-only memory (ROM), erasable programmable read-only memory (e.g., EPROM, EEPROM, or Flash memory), or any other tangible medium capable of storing information. Moreover, it is explicitly contemplated that a module could be centralized in a single component or be distributed across multiple components as deemed suitable by those of skill in the relevant art.

II. Overview

An example scenario is described here in accordance with the present systems and methods. This example scenario is meant by way of example and illustration and not at all by way of limitation. In the example scenario, a shipping company maintains a fleet that includes thousands of trucks, each of which have installed thereon an onboard system that includes a TCM. In this example scenario, that TCM is manufactured, maintained, and supported by a technology company that is separate and distinct from the shipping company. From time to time, the shipping company may request certain changes to the functionality of the TCM, where such changes necessitate updating the TCM with respect to its firmware, its software, and/or one or more of its configuration settings. In such an instance, the technology company may "push" an OTAP update to every vehicle in the fleet or perhaps some defined subset thereof.

In the context of a given vehicle, the technology company may push this OTAP update by sending a notification message via a wireless data connection to a wireless-communication module with which the vehicle has been equipped. The vehicle's onboard system may responsively request a download of the entire update from the network-side infrastructure that is utilized by the technology company. In other cases, the technology company may simply push the entire update in whole or in pieces until it has been successfully downloaded by the vehicle (i.e., by one or more components of the onboard system of the vehicle).

Once that download is successfully completed, the onboard system may notify the driver in some way that an update is ready to be installed. In some embodiments, the onboard system notifies the driver unconditionally (e.g., while the driver is driving the vehicle 70 miles per hour (mph) along a U.S. Interstate). In other embodiments, the onboard system does not notify the driver of the ready-for-installation update until one or more preconditions are satisfied. One example of such precondition is that the ignition switch of the vehicle is in an ON position (as opposed to an OFF position or a CRANKED position, as is known in the art). Another example of such a precondition is that the prime mover (e.g., the internal-combustion engine) of the vehicle is in a NOT-RUNNING state (as opposed to a RUNNING state, as is known in the art). And certainly one or more additional preconditions (e.g., time of day, location, and/or the like) could be listed here in addition to or instead of those two examples.

Moreover, in some embodiments in which the vehicle notifies the driver unconditionally that an update is ready to be installed, the onboard system (e.g., the TCM) nevertheless insists on a set of one or more preconditions being satisfied before the onboard system will actually install the update, regardless of whether the driver attempts to make that installation begin. Such would naturally be a safety consideration among other reasons.

Whether or not satisfaction of one or more preconditions is required, the vehicle in certain embodiments will only initiate installation of the available update in response to receiving a confirmation input via the operator interface of the vehicle, perhaps in recognition of the desirability of not triggering a TCM-reprogramming event without a driver's consent. In some embodiments, this confirmation input can be received as a sequence of shift-selector-position inputs. In other embodiments, this confirmation input can be received as a user input on a touchscreen if such has been installed in the vehicle. Confirmation inputs could also be entered via a mobile device that is in communication with the vehicle via, as examples, a Universal Serial Bus (USB) connection, a Bluetooth connection, and/or the like. And certainly other examples of ways in which a confirmation input could be received via the operator interface of the vehicle could be listed here, as these are merely some representative examples.

Upon receiving the confirmation input, the vehicle (e.g., the onboard system (e.g., the TCM)) may then responsively install the available update and, once completed, present the operator (i.e., the driver) of the vehicle with a confirmation indication that the installation has been completed successfully. Of course upon encountering any problems, errors, interruptions, and/or the like, a suitable alert could be presented to the operator to convey that status. In the balance of this detailed description, examples of architecture and then operation are described with reference to the figures.

Among the advantages of the present systems and methods is that at least some embodiments enable operator approval and therefore triggering of OTA with existing transmission inputs. Another advantage is that at least some embodiments enable such OTA reprogramming to occur without reliance on what is known in the art as a head unit (including, e.g., an infotainment and/or stereo system), a heads-up display, and/or the like. That is, with respect to at least some embodiments, additional hardware is not required to implement the present systems and methods in the context of existing vehicles, providing savings of cost and time among other aspects. The present systems and methods may well prove particularly advantageous in the context of vehicle onboard systems that do not have what is known in the art as a wake-on controller area network (CAN) or a twin-memory architecture.

Additionally among the advantages of the present systems and methods is that embodiments are compatible with multiple product lines, simple to use, and suitable for both high-end and cost-effective vehicle installations. Moreover, another advantage is that, in a scenario like the example scenario described above, an OTAP update to a TCM would be installed if and only if approval was present from the shipping company, the technology company, and the driver. The shipping company may indicate their approval by requesting a feature change and/or sending an update to the technology company and requesting that it be pushed to the fleet. The technology company may indicate their approval by pushing the update, and the driver may indicate his or her approval by entering a confirmation input via the operator interface of the vehicle as described herein.

Also among the advantages of the present systems and methods are reducing visits to the service channel, eliminating a need for vehicle hardware to be physically connected (e.g., at a repair location) to receive updates, allowing for new features to be added and existing features to be enabled and/or configured, reducing the time needed to receive warranty improvements, and mitigation of potential cybersecurity vulnerabilities. And certainly there are other advantages of various embodiments of the present methods and systems that could be listed here.

III. Example Architecture a. Example TCM

FIG. 1 is a simplified functional block diagram of an example TCM 102 that includes a communication interface 104, a processor 106, and a CRM 108 that itself contains firmware 110, software 112, and configuration settings 114. It should be understood that the depicted architecture of the TCM 102 is presented by way of example, and that other architectures could be used as deemed suitable by those of skill in the relevant art. In addition to the functions disclosed herein, the TCM 102 generally functions as known in the relevant art to control, manage, diagnose, and/or monitor the operation of an associated transmission.

In at least one embodiment, the communication interface 104 includes a wired-communication interface for communicating with one or more other devices, components, and/or the like of a given vehicle according to a wired-communication protocol such as society of automotive engineers (SAE) J1939, USB, and/or any other wired-communication protocol deemed suitable by those of skill in the relevant art.

In at least one embodiment, instead of or more likely in addition to the wired-communication interface, the communication interface 104 further includes a wireless-communication interface that includes the corresponding hardware, firmware, and the like for communicating wirelessly with one or more other entities using one or more wireless-communication protocols such as Bluetooth, LTE, WiMAX, CDMA, and/or the like. In some embodiments, the communication interface 104 of the TCM 102 communicates in a wired fashion with one or more other entities that themselves then communicate wirelessly across an air interface with a network-side infrastructure, as is described more fully below in connection with at least FIG. 5.

The processor 106 may take the form of or include one or more processors of any suitable type, such as but not limited to microprocessors, microcontrollers, microchips, ASICs, FPGAs, and/or the like. In some installations, the processor 106 includes one processor that is deemed the central processing unit (CPU) of the TCM 102 and one or more additional processors respectively dedicated to one or more specific tasks, such as signal processing and/or the like. And certainly other example configurations of the processor 106 could be listed here.

The CRM 108 may take the form of or include one or more non-transitory CRMs of any type deemed suitable by those of skill in the relevant art, where a non-limiting list of examples includes any suitable non-transitory CRM such as, as examples, memory devices, RAMs, ROMs, EPROMs, EEPROMs, Flash memory, and/or any other non-transitory CRM capable of storing information. Moreover, the CRM 108 could be centralized in a single component or be distributed across multiple components as deemed suitable by those of skill in the relevant art. It is further noted that while all three of the firmware 110, the software 112, and the configuration settings 114 are depicted in FIG. 1, one or more of these types of data may not be present in certain embodiments, and certain embodiments may further have one or more types of data stored in the CRM 108 other than those depicted in FIG. 1. That being said, the balance of this written description by way of example treats all three depicted elements—i.e., the firmware 110, the software 112, and the configuration settings 114—as being present in the described embodiments.

In at least one embodiment, the firmware 110 contains instructions executable by the processor 106 for interacting with various hardware elements and for providing an environment in which one or more applications can be executed, the software 112 contains the instructions that make up those one or more applications.

In at least one embodiment, the configuration settings 114 includes values that may be referred to herein and in the art as parameters, operating values, configuration settings, and the like. The term configuration settings in this disclosure is covers all such types of data.

b. Example Vehicle with Operator Interface

Figure 2:
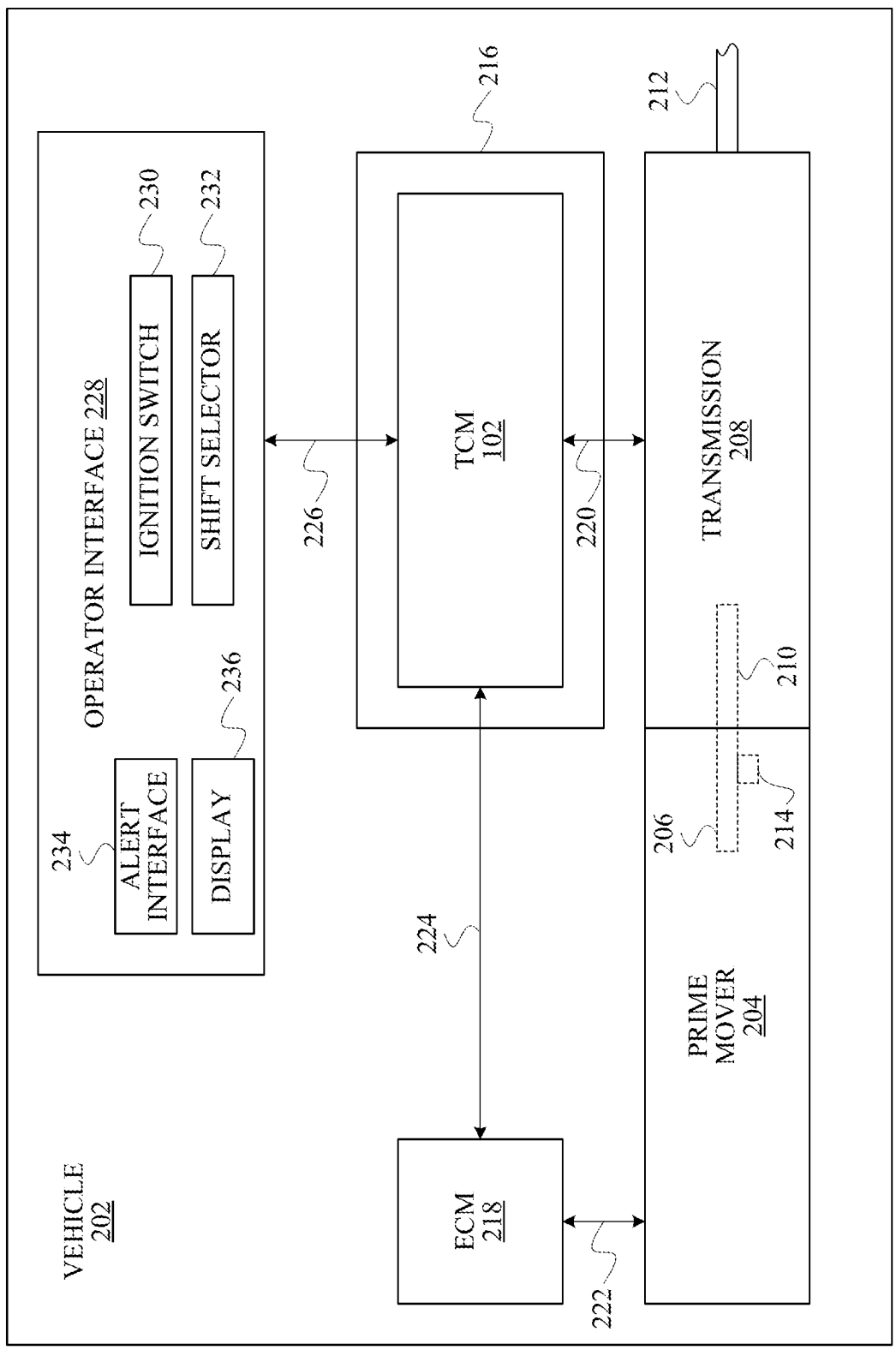
FIG. 2 is a simplified functional block diagram of an example vehicle that includes an example operator interface as well as the example TCM of FIG. 1, in accordance with at least one embodiment.

FIG. 2 is a simplified functional block diagram of an example vehicle 202 that includes an example operator interface 228 as well as the example TCM 102. In the embodiment that is depicted in FIG. 2, the vehicle 202 also includes a prime mover 204 having a prime-mover output shaft 206 and a speed sensor 214; a transmission 208 having a transmission input shaft 210 and a transmission output shaft 212; a data link 220 communicatively connecting the TCM 102 and the transmission 208; an engine control module (ECM) 218 communicatively connected to the prime mover 204 via a data link 222 and communicatively connected to the TCM 102 via a data link 224; a data link 226 communicatively connecting the TCM 102 and the operator interface 228; and an onboard system 216 on which the TCM 102 illustratively resides. It is contemplated that the data links 220, 222, 224, and 226 could all be the same physical data link (e.g., a system bus) or separate data links, and that their separate depiction is by way of example and to illustrate communicative connectivity among various elements, and is not meant in any way to limit this disclosure to a particular set of separate data links. Such is the case with all sets of data and any other communication links described herein. Furthermore, the operator interface 228 is depicted as including an ignition switch 230, a shift selector 232, an alert interface 234, and a display 236. It should be understood that the depicted architecture of the vehicle 202 is presented by way of example, and that other architectures could be used as deemed suitable by those of skill in the relevant art.

The vehicle 202 could be a truck, car, bus, van, or any other type of vehicle that would generally have the components—and function generally as—discussed herein.

The prime mover 204 could be an engine such as an internal-combustion engine, a rechargeable electric motor, or any other type of prime mover suitable to bring about translational motion of the vehicle 202. In at least one embodiment, the prime mover 204 has at least two operating states: (i) a RUNNING state in which the prime mover 204, if suitably engaged by a clutch or the like (if present) causes at least a threshold amount of rotational movement of the prime-mover output shaft 206 to bring about translational movement of the vehicle 202 and (ii) a NOT-RUNNING state, in which the prime mover 204 is producing less than that threshold amount of rotational movement (e.g. producing zero or effectively zero rotational movement) of the prime-mover output shaft 206. Furthermore, the speed sensor 214 is configured to measure the rate of rotational movement of the prime-mover output shaft and to provide digital data representative of that measurement to a requesting entity such as the ECM 218 or the TCM 102, among other possibilities. It is further noted that the speed sensor 214 could instead—or additional sensor(s) could—be arranged on the transmission input shaft 210 and/or the transmission output shaft 212, among other possible sensor-deployment options.

The transmission 208 could be an automatic transmission, perhaps a multi-speed automatic transmission capable of establishing a plurality of forward speed ratios between the rotational speed of the transmission input shaft 210 and the transmission output shaft 212. In general, then, the transmission 208 functions to transmit the rotational motion of the prime-mover output shaft 206 to the transmission output shaft 212 via mechanical communication involving at least the transmission input shaft 210, which could be coupled with or physically integral with the prime-mover output shaft 206. That aforementioned mechanical communication could also include components such as a torque converter, a flywheel, and/or the like, as is known to those of skill in the relevant art. The transmission output shaft 212 is then in turn coupled to one or more axles or the like that are in turn coupled to tires to bring about the aforementioned translational motion of the vehicle 202.

Some examples of multi-speed automatic transmissions are automatic transmissions and automated manual transmissions. Some examples of automated manual transmissions are sliding mesh transmissions and constant mesh transmissions. The transmission 208 may continuously provide power from the transmission input shaft 210 to the transmission output shaft 212 during shifting, or it may instead be the case that power transfer from the transmission input shaft 210 to the transmission output shaft 212 is interrupted during shifting. And certainly other types of transmissions could be listed here.

The onboard system 216 on which the TCM 102 illustratively resides could take the form of or include a motherboard or other type of printed circuit board (PCB), a computing-and-communication device generally, and/or any other type of computing hardware, system, or the like of which the TCM 102 is a functional component. It is noted that, in at least one embodiment, the TCM 102 makes up the entirety of the onboard system 216, while in at least one other embodiment, the TCM 102 is but one component of the onboard system 216.

The ECM 218 is, as described above, communicatively connected with the TCM 102 via the data link 224 and is also communicatively connected with the prime mover 204 via the data link 222. The ECM may also be communicatively connected to one or more additional components of the vehicle 202, as these two instances are provided by way of example. In operation, the ECM 218 in at least one embodiment functions to control and manage the overall operation of the prime mover 204. Prime mover 204 may include a speed-reducing device (not depicted) that reduces the speed of the prime mover 204. Example speed-reducing devices include an engine brake and an exhaust brake, though one or more other speed-reducing devices could be used instead or in addition. The ECM 218 may be communicatively connected with the speed-reducing device to control the speed of the prime mover 204.

The ECM 218 is, in at least one embodiment, also operative to exchange instructions and data with the TCM 102 in a conventional manner. In one embodiment, for example, the TCM 102 and the ECM 218 are operable to exchange information via the data link 224 in the form of one or more messages in accordance with the aforementioned J1939 communications protocol, although this disclosure contemplates other embodiments in which the TCM 102 and the ECM 218 are operable to exchange information via the data link 224 in accordance with one or more other conventional communication protocols.

The data links 220-226 may each be any suitable communication bus or other communicative data connection deemed suitable by those of skill in the art for a particular context or for a given implementation.

The operator interface 228 in at least one embodiment includes all of the input devices and output devices (and perhaps one or more combined input/output devices) that an operator of the vehicle 202 can use to input commands or other information and/or receive output indications, values, signals, alerts, and the like. This would include aspects of the vehicle such as the steering wheel, the accelerator and brake pedals, any dashboard lights, speakers, and/or the like. In at least one embodiment, and as depicted in FIG. 2, the operator interface 228 includes the ignition switch 230, the shift selector 232, the alert interface 234, and the display 236, each of which is discussed more fully below.

The ignition switch 230 may take the form of any conventional ignition switch that may be arranged to receive a key or perhaps be a keyless ignition option such as a push button. In at least one embodiment, the ignition switch 230 has at least two positions. The first such position is an OFF position in which neither the electrical system (e.g., the TCM 102) nor the prime mover 204 is in an operating state—in other words, the vehicle 202 is quiet and off. The second such position is an ON position in which at least the electrical system of the vehicle 202 is powered up and operating, and in which the prime mover 204 could be either in its RUNNING state or in its NOT-RUNNING state. In many embodiments, the ignition switch further has a third position: a CRANKED position which an operator would use to transition the prime mover 204 from its NOT-RUNNING state to its RUNNING state. Typically, upon physical release by the operator of the ignition switch 230 when in the CRANKED position, the ignition switch 230 would come to rest in the aforementioned ON position.

The shift selector 232 is as a general matter a component of the operator interface that is operable in its primary purpose to allow the operator of the vehicle 202 to put the transmission 208 in one of a number of possible states, such as a PARK state, a REVERSE state, a NEUTRAL state, and one or more DRIVE states. As is conventionally known in the art, the vehicle is (i) fixed by the transmission 208 in a non-moving condition when the transmission 208 is in the PARK state, (ii) operable for reverse motion in the REVERSE state (of which there could be more than one), (iii) not being impelled but free to roll when the transmission 208 is in the NEUTRAL state, and (iv) operable for forward motion according to a given forward-gear ratio when the transmission 208 is in the DRIVE state (or in one of the plurality of DRIVE states in embodiments in which there is more than one such state).

Figure 3:
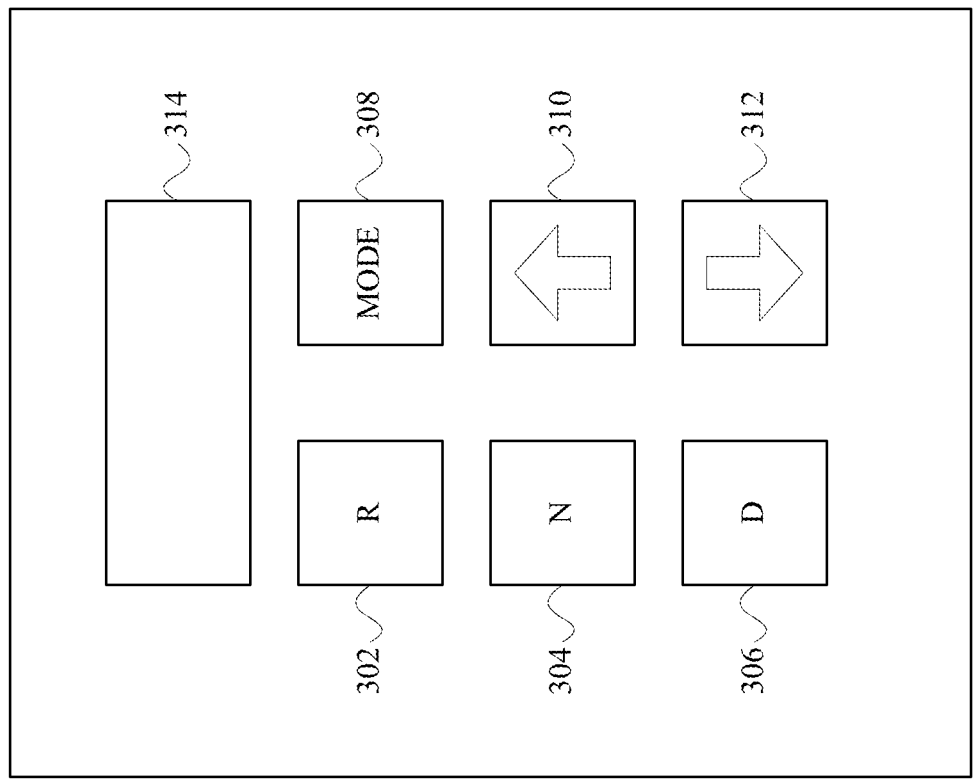
FIG. 3 depicts a first example shift selector of the example operator interface of FIG. 2, in accordance with at least one embodiment.

Turning to FIG. 3, shown there is a depiction of a first example shift selector 232A that can be used in connection with at least one embodiment. In the depicted embodiment, the shift selector 232A includes a REVERSE button 302, a NEUTRAL button 304, a DRIVE button 306, a MODE button 308, an UP-ARROW button 310, a DOWN-ARROW button 312, and a display region 314. It is contemplated that the shift selector 232A could be arranged in a housing on a dashboard of the vehicle 202 and have actual physical buttons, but could instead be represented as a touchscreen display having soft buttons, among other options that could be listed here. The display region 314 may be arranged to provide visual feedback to the operator of the vehicle 202 of the status of one or both of the vehicle 202 and the TCM 102. Examples of technology that could be implemented in connection with the display region 314 include an LED display, an LCD display, a plurality of indicator lights, and/or other suitable visual indicators. In one example, the display region 314 provides a visual indication of a vehicle direction of the vehicle 202, a currently selected gear-shift position, and, if applicable, one or more fault codes. And certainly other values could be displayed as well or instead of the examples listed.

In at least one embodiment, the TCM 102 is responsive to operator selection of the REVERSE button 302 to configure the transmission 208 to operate in a reverse gear, responsive to operator selection of the NEUTRAL button 304 to configure the transmission 208 to operate in a neutral state wherein neither a forward or a reverse gear is engaged, responsive to operator selection of the DRIVE button 306 to configure the transmission 208 to operate in a forward gear. Furthermore, once operating in a forward gear, the TCM 102 may be responsive to the UP-ARROW button 310 and the DOWN-ARROW button 312 to change which forward gear the transmission 208 is operating in, presuming that prevailing conditions and associated logic do not prevent such a forward-gear shift. Moreover, the TCM 102 may be responsive to user selection of the MODE button 308 to configure the transmission 208 to select certain operating modes; for example, the transmission 208 may have a secondary output shaft that is used for a power take-off ("PTO") operation, and the operator may activate the secondary output shaft using the MODE button 308. The MODE button 308 may also be used for other operations, such as clearing fault codes, among numerous other examples that could be listed here. It is also noted that multiple reverse gears may be available in certain implementations, and that the TCM 102 may be responsive to the UP-ARROW button 310 and the DOWN-ARROW button 312 to change in which reverse gear the transmission 208 is operating. It is further noted that not all shift selectors have a digital display: some are simply labeled next to the shifter, some on the dashboard, some on another display, and other implementations are contemplated as well. Many other arrangements are possible as well, including shift selectors having any number (including more than 5) forward positions, any number of reverse positions, some not having a park position, and the like.

Figure 4:
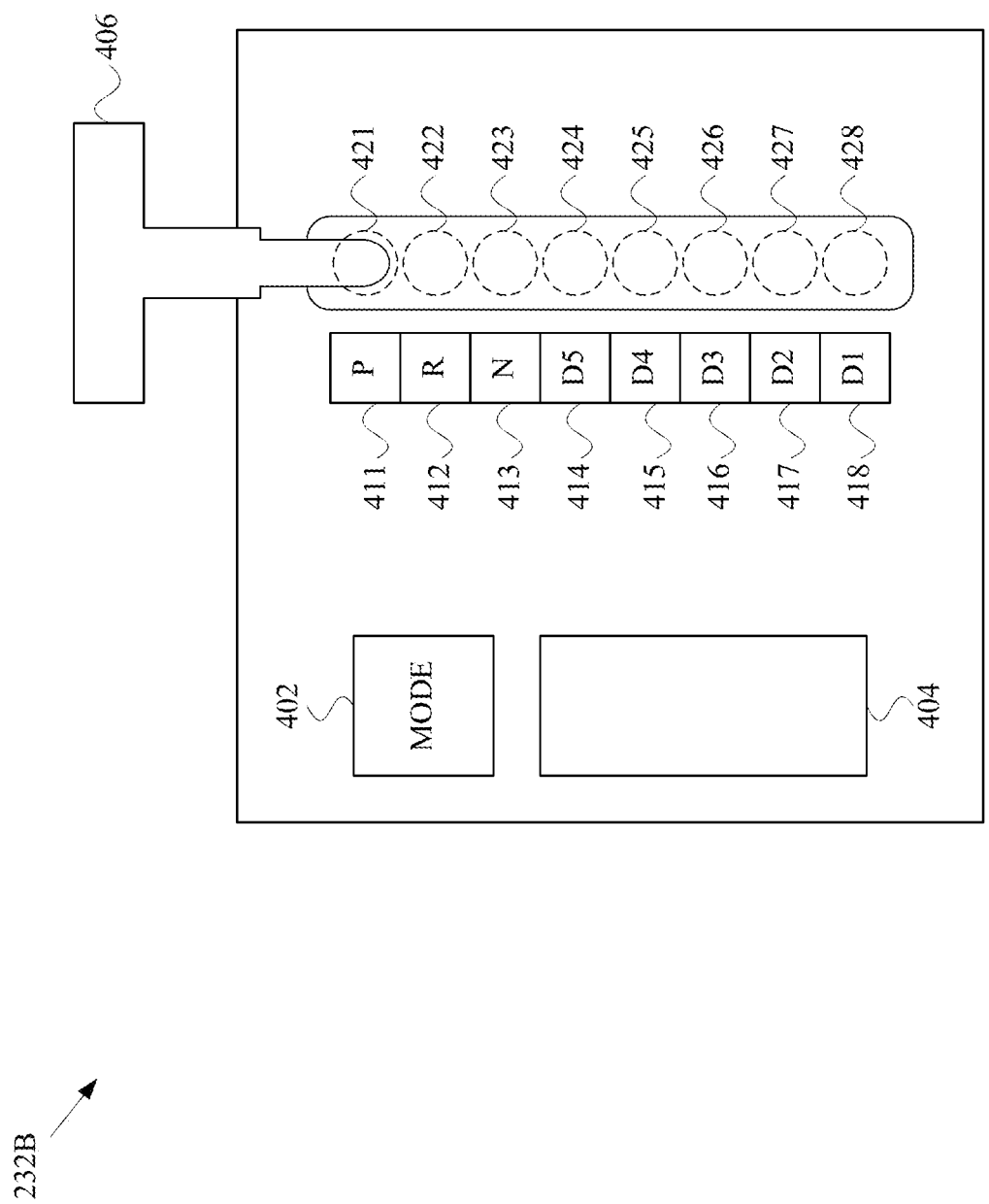
FIG. 4 depicts a second example shift selector of the example operator interface of FIG. 2, in accordance with at least one embodiment.

Turning to FIG. 4, shown there is a depiction of a second example shift selector 232B that can be used in connection with at least one embodiment. As shown, the shift selector 232B includes a MODE button 402, a display region 404, and a shifter 406. The MODE button may operate substantially as described above with respect to the MODE button 308 of FIG. 3, and the display region 404 may operate substantially as described above with respect to the display region 314 of FIG. 3. Moreover, as depicted, the shifter 406 can be positioned by an operator of the vehicle 202 in any one of the following positions:

- a PARK position 421 that is shown in association with a PARK indicator (P) 411 and that places the transmission 208 in the PARK state;
- a REVERSE position 422 that is shown in association with a REVERSE indicator (R) 412 and that places the transmission 208 in the REVERSE state;
- a NEUTRAL position 423 that is shown in association with a NEUTRAL indicator (N) 413 and that places the transmission 208 in the NEUTRAL state;
- a fifth DRIVE position 424 that is shown in association with a fifth DRIVE indicator (D5) 414 and that places the transmission 208 in a fifth DRIVE state;
- a fourth DRIVE position 425 that is shown in association with a fourth DRIVE indicator (D4) 415 and that places the transmission 208 in a fourth DRIVE state;
- a third DRIVE position 426 that is shown in association with a third DRIVE indicator (D3) 416 and that places the transmission 208 in a third DRIVE state;
- a second DRIVE position 427 that is shown in association with a second DRIVE indicator (D2) 417 and that places the transmission 208 in a second DRIVE state; and
- a first DRIVE position 428 that is shown in association with a first DRIVE indicator (D1) 418 and that places the transmission 208 in a first DRIVE state.

As will be understood by those of skill in the art, the first through fifth DRIVE states correspond respectively with five different forward-gear ratios. In general, then, the shifter 406 is manually actuatable to the plurality of different positions 421-428. In at least one embodiment, the shifter 406 being placed in a given position among the plurality of different positions 421-428 corresponds to a different input signal that is provided from the operator interface 228 to the TCM 102 via the data link 226.

Returning now to FIG. 2 and to the operator interface 228 in particular, the alert interface 234 may include any number of indicator lights, message screens, speakers, and/or one or more output-device types of any sort deemed suitable by those of skill in the art to convey any sort of alert information to an operator of the vehicle 202. In at least one embodiment, the alert interface 234 includes a check-transmission light. Furthermore, the display 236 could be a one-way device (e.g., LCD) that only conveys information to the operator of the vehicle 202, or could instead be a touchscreen display that is operable to both present information, prompts, confirmations, warnings, apps, and the like and to also accept touchscreen inputs, as is known generally in the art of touchscreen electronics.

IV. Example Operation a. Example Communication Scenario

Figure 5:
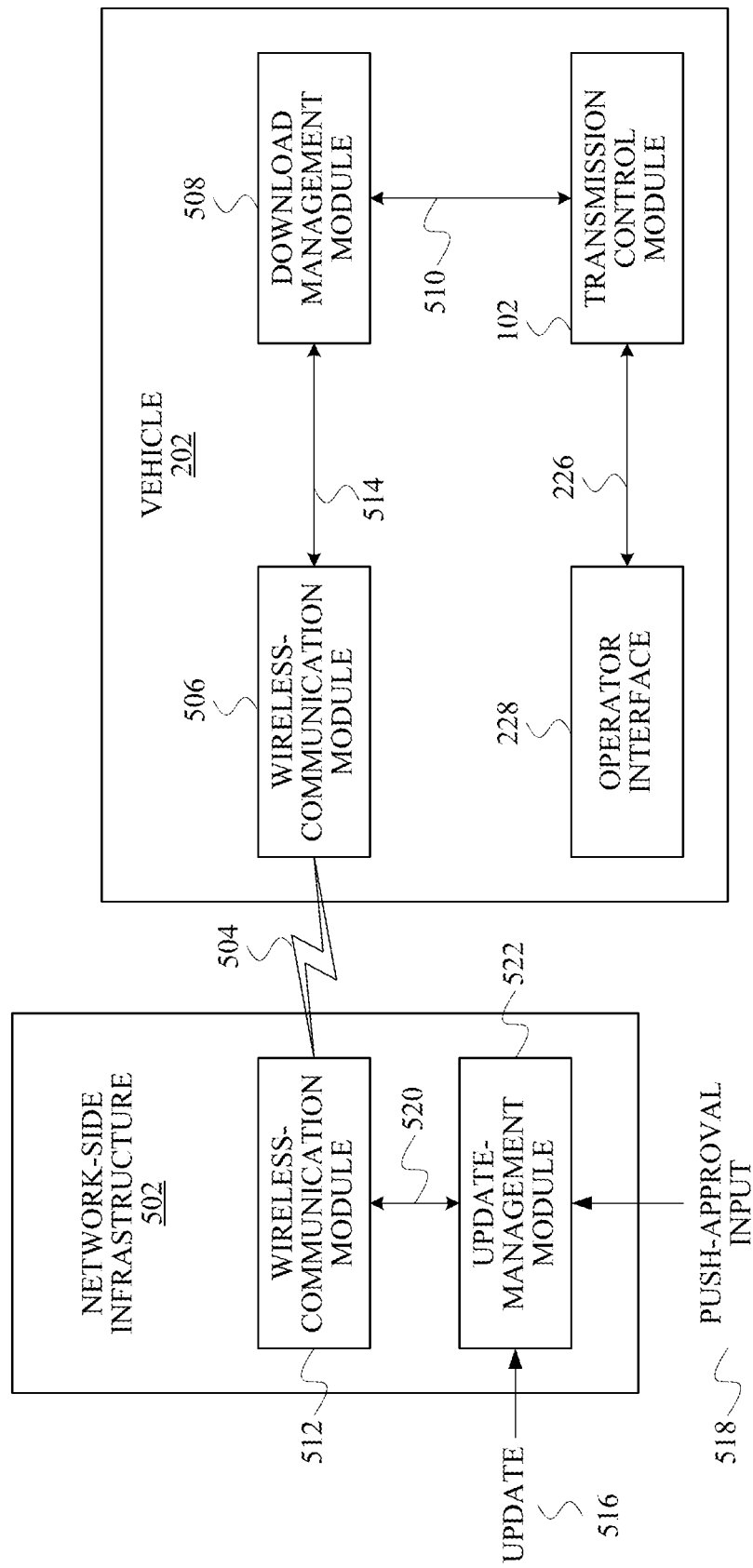
FIG. 5 depicts an example communication scenario that includes the example vehicle of FIG. 2, in accordance with at least one embodiment.

Turning now to FIG. 5, depicted therein is an example communication scenario 500 that includes the vehicle 202, and that also includes what is referred to herein as a network-side infrastructure 502. As depicted, the vehicle 202 and the network-side infrastructure 502 communicate with one another via a wireless data link 504, which in at least one embodiment is a secure (e.g., encrypted) wireless data link to avoid, minimize, or at least reduce risks associated with cybersecurity attacks. In various different embodiments, some or all of the messages sent across the wireless data link 504 are encrypted and/or signed. Thus, all of the following options are contemplated: neither the link nor the messages could be secure, just the link itself could be secure, each message could carry its own security, or both the link itself could be secured and the messages could carry their own security.

The network-side infrastructure 502 includes a wireless-communication module 512 that is communicatively connected with (i) the wireless data link 504 and (ii) via a data link 520 with an update-management module (UMM) 522. The data link 520 could be wired and/or wireless, consistent with the above description of various other data links such as the data links 220-226 of FIG. 2. In some instances, the network-side infrastructure 502 may represent what those in the art and in society in general refer to as "the cloud," i.e., a set of one or more computing devices that are located on a network and are accessible from multiple attachment points such as wireless data links and the like. In some cases, the communication between the network-side infrastructure 502 and the vehicle 202 over the wireless data link 504 is referred to as "telematics," and an associated provider of such services is often known as a telematics service provider (TSP), and may be known by one or more other names as well.

Each of the wireless-communication module 506 and the wireless-communication module 512 include hardware (e.g., chipsets, antennas, and the like) as well as firmware, software, and/or other configuration data needed to communicate according to one or more wireless-communication protocols such as LTE, one or more of the other wireless-communication protocols mentioned herein, and/or one or more other wireless-communication protocols (e.g., 5G) deemed suitable by those of skill in the art for a given implementation. In some instances, the wireless-communication module 512 of the network-side infrastructure 502 may be equipped and configured to serve multiple, perhaps many, client devices such as the wireless-communication module 506 of the vehicle 202.

In at least one embodiment, the UMM 522 is equipped, programmed, and configured to accept an update 516 and a push-approval input 518, and also to push an OTAP update via the data link 520, the wireless-communication module 512, and the wireless data link 504 to the wireless-communication module 506 of the vehicle 202. The update 516 could be received from within the same entity (e.g., a technology company) that also operates the network-side infrastructure 502, or could instead be received from an external entity such as a shipping company that is a client or customer of the technology company. And certainly numerous other arrangements could be listed here as well. The push-approval input 518 is an input that authorizes the pushing of a given update from the UMM to the vehicle 202. In instances in which the update 516 comes from an external organization, the presence of the push-approval input 518 in the process helps ensure that both the external organization (e.g., the aforementioned shipping company) and the organization that operates the network-side infrastructure 502 (e.g., the aforementioned technology company) provide authorization that a given update be pushed. That required pair of authorizations, along with the receipt by the TCM 102 of a valid confirmation (i.e., initiate-update) instruction via the operator interface 228 provides in at least some embodiments a triple-approval process before a given OTAP update is ultimately installed.

On the client side, it can be seen in the embodiment that is depicted in FIG. 5 that the vehicle 202 is shown as including the aforementioned wireless-communication module 506, which is connected via a data link 514 to a download management module (DMM) 508, which in turn is connected via a data link 510 to the TCM 102. And as is also depicted in FIG. 2, the TCM 102 and the operator interface 228 are shown as being in communicative contact via the data link 226. As above, the data links 510, 514, and 520 could take any form deemed suitable by those of skill in the relevant art for a given implementation. It should be understood as well that the other components of the vehicle 202 that are depicted in FIG. 2 but not depicted in FIG. 5 (e.g., the ECM 218) are still present in various embodiments and are simply not depicted in FIG. 5 for clarity of presentation of the aspects of the present disclosure on which FIG. 5 is more focused.

In at least one embodiment, the DMM 508 is arranged to receive update-available indications from the UMM 522 via the above-described communication path, and to pass such alerts on to the TCM 102. The DMM 508 may also be arranged to respond to such notifications from the network side by requesting that the UMM 522 transfer the entire actual update to the DMM 508, which may only then notify the TCM 102 that an update is available. Such design choices are within the skill of those in the relevant art. In at least one embodiment, the DMM 508 takes the form of a hardware device that is configured to be mounted onboard a TSP device (which may be or at least include the wireless-communication interface 506) of the vehicle 202. In other embodiments, the DMM 508 takes the form of executable code residing in a device that may be intermediate between the wireless-communication interface 506 and the TCM 102, or perhaps within the memory of the TCM 102 itself. And certainly other implementation options will occur to those of skill in the art and could be listed here. The DMM 508 may also be configured to relay messages (e.g., update-installation-success and update-installation-failure messages) from the TCM 102 to the UMM 522.

b. First Example Method

Figure 6:
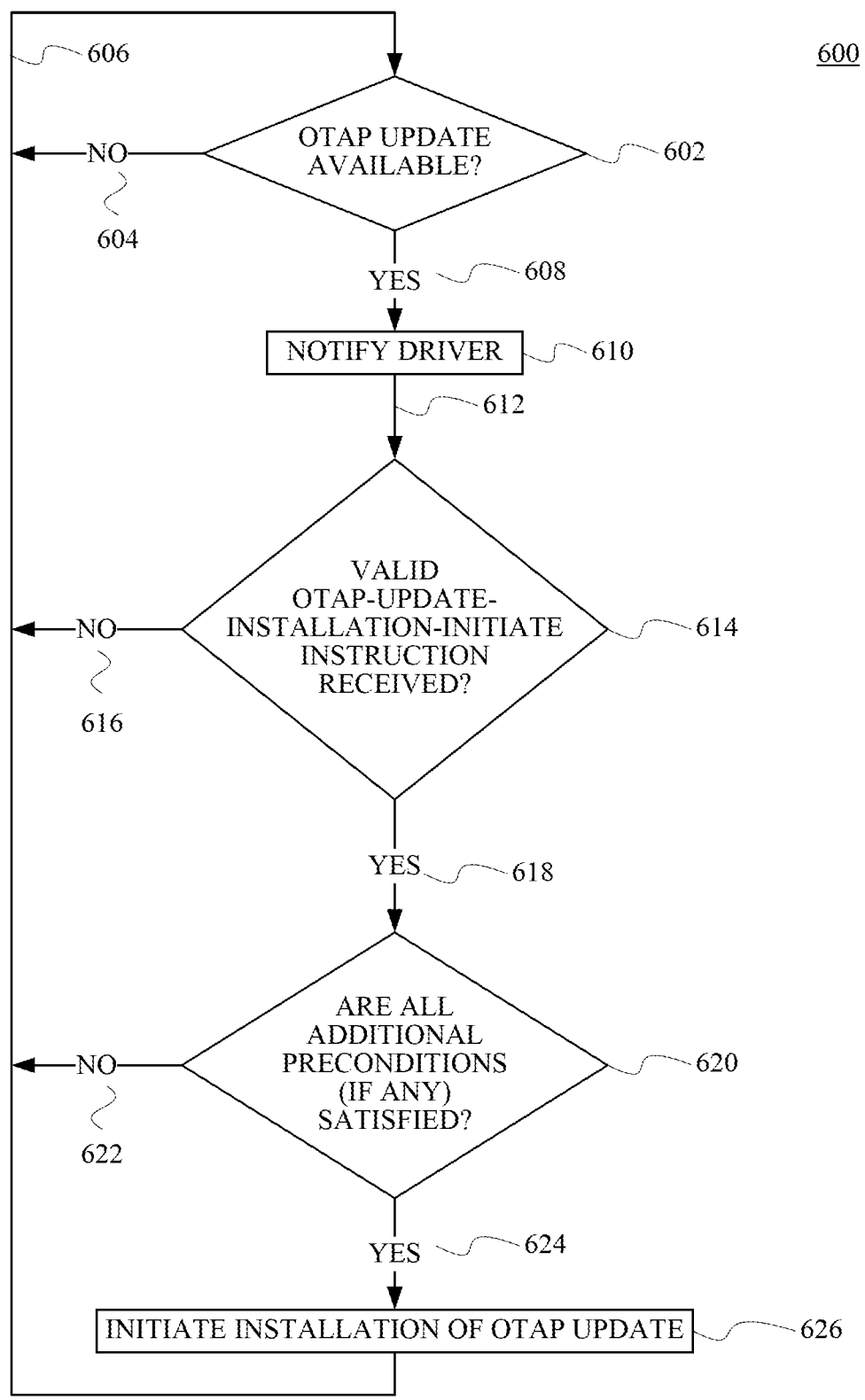
FIG. 6 depicts a first example method, in accordance with at least one embodiment.

FIG. 6 depicts a first example method 600 that may be carried out by a TCM such as the TCM 102. The carrying out of the method 600 by a TCM is provided by way of example, in that the method 600 could be carried out by another device that is suitably equipped, programmed, and configured to carry out the associated functions.

At 602, the TCM 102 determines whether an OTAP update is available. If not, then at 604 the TCM 102 returns on path 606 to step 602. If so, then the TCM 102 proceeds at 608 to responsively present at 610 an update-ready indication via the operator interface 228.

At step 614, after presenting the update-ready indication at 610, the TCM follows path 612 to 614, where the TCM 102 determines whether a valid initiate-update instruction has been received via the operator interface 228. If not, the TCM 102 returns at 616 on the path 606 to step 602. But if so, the TCM 102 proceeds at 618 to 620, where the TCM 102 determines whether each precondition in a set of one or more additional preconditions (i.e., in addition to the precondition evaluated at 614) is satisfied. If not, the TCM 102 returns at 622 on path 606 to step 602. But if so, the TCM 102 proceeds at 624 to step 626, where the TCM 102 initiates installation of the particular OTAP update.

Thus, one way to look at steps 614 and 620 (and their associated conditional processing) collectively is that the TCM 102 is determining whether each precondition in a set of one or more preconditions is satisfied, where that set includes a first precondition that a valid initiate-update instruction has been received via the operator interface 228. In other words, the set of one or more preconditions can be thought of as made up of that first precondition and the set of one or more additional preconditions (of which there might be none, one, or more than one, as described more fully below).

Figure 7:
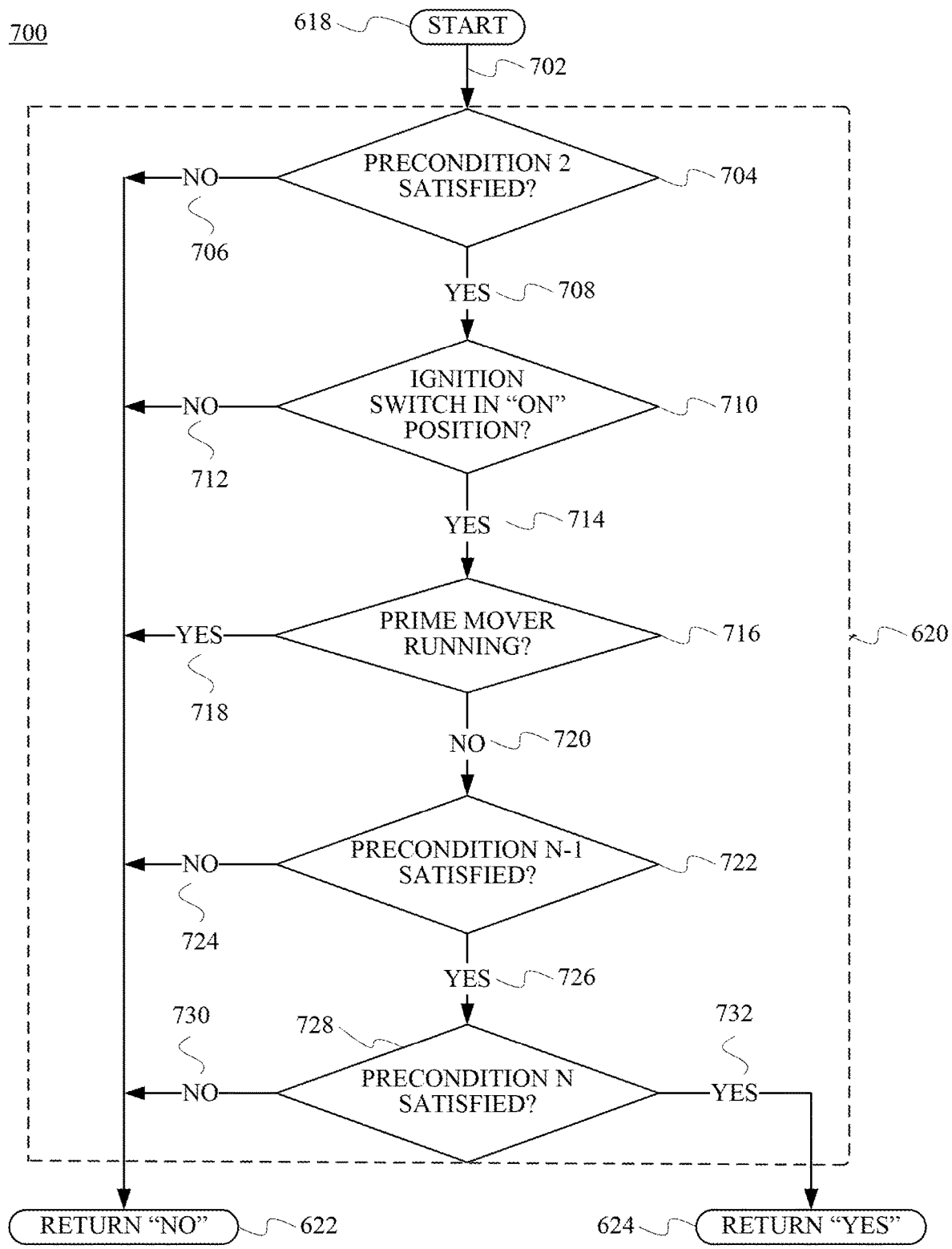
FIG. 7 depicts an example submethod that may be carried out in connection with a part of the first example method of FIG. 6, in accordance with at least one embodiment.

Turning now to FIG. 7, depicted therein is an example submethod 700 that may be carried out in connection with a part of the method 600. In particular, the submethod 700 pertains to reference numerals 618, 620, 622, and 624 of FIG. 6. And as can be seen by inspection of FIG. 6, the bulk of the submethod 700 pertains to the decision box 620 of FIG. 6, at which the TCM, as described above, determines whether each precondition in a set of one or more additional preconditions (i.e., in addition to the precondition evaluated at 614) is satisfied. The reader will recall that the precondition that is evaluated at 614 is whether a valid initiate-update instruction has been received via the operator interface 228.

The submethod 700 begins at 618, where the TCM 102 proceeds at 702 to evaluate at 704 whether a generically named "precondition 2" is satisfied. This "precondition 2" could just as well be labeled "additional precondition 1" in the parlance of this disclosure. If precondition 2 is not satisfied, the TCM proceeds at 706 to return NO, corresponding to the similarly labeled arrow 622 of FIG. 6. If precondition 2 is satisfied, however, the TCM 102 proceeds at 708 to 710, where the TCM 102 determines whether the ignition switch 230 is in its ON position.

If it is determined by the TCM 102 at 710 that the ignition switch 230 is not in its ON position, the TCM 102 proceeds at 712 to return NO at 622 as described above. But if it is determined by the TCM 102 at 710 that the ignition switch 230 is in its ON position, the TCM 102 proceeds at 714 to the decision box 716, where the TCM determines whether the prime mover 204 is in its RUNNING state; if not, the TCM 102 proceeds at 718 to return NO at 622; if so, the TCM 102 proceeds at 720 to decision box 722.

At decision box 722, the TCM 102 evaluates whether a generically named precondition N−1 is satisfied: if not, the TCM 102 proceeds at 724 to return NO at 622; if so, the TCM 102 proceeds at 726 to decision box 728. Similarly, at decision box 728, the TCM 102 evaluates whether a generically named precondition N is satisfied: if not, the TCM 102 proceeds at 730 to return NO at 622; if so, the TCM 102 proceeds at 732 to return YES to the method 600 at 624, corresponding to the similarly labeled arrow 624 in FIG. 6.

In some embodiments, N is zero, in which case the submethod 700 is unnecessary. In various other embodiments, the ignition-switch precondition, the prime-mover-state precondition, and/or one or more other preconditions deemed suitable by those of skill in the art for a given implementation could be used. Some possible examples include vehicle location, time of day, urgency of the update relative to a task (e.g., delivery) for which the vehicle 202 is currently in use, and/or the like. Another example of a precondition that could be enforced is that a calibration-configurable original-equipment-manufacturer (OEM) option as to whether OTAP updates are allowed is set in the affirmative. This may be particularly applicable in emergency and military-vehicle contexts, though such an option could be implemented in connection with any vehicle. Another example precondition that could be enforced is that a parking brake is set; the status of the parking brake could be monitored via CAN messaging as described herein. Moreover, it is explicitly contemplated that any one or more preconditions mentioned herein could be implemented in connection with any given embodiment.

Returning to FIG. 6, the OTAP update could pertain to one, two, or all three of firmware, software, and configuration settings of the TCM 102. Updating a subset of operating parameters could be referred to as "parameter trimming," and could help eliminate a need to go to a service channel for minor updates, facilitate new feature enablement and configuration, shift-schedule modification, and the like. Such an operation may be referred to as a Level 1 operation in this context.

Performing a full-calibration update (i.e., all or substantially all configuration settings) may be referred to as a Level 2 operation in this context, and may help to facilitate changing what are known as vocational models, improving shift quality, improving any calibration issues generally, and perhaps providing some limited mitigation for any cybersecurity vulnerabilities.

Moreover, updating or even fully replacing the software and/or firmware of the TCM 102 in an update may be referred to as a Level 3 operation in this context. Such an operation could be helpful in facilitating functions such as installing new software features, improving existing software installations, perhaps more fully (as compared with the above-described Level 2 operation) mitigating any cybersecurity vulnerabilities, and improving alignment (i.e., compatibility and efficient operation) between hardware and software.

In this framework, it would generally be the case that higher-level operations (e.g., a Level 3 operation as compared with a Level 1 operation) would generally be associated with increased scope, increased value, increased risk, and increased cost. Such are considerations for those of skill in the relevant art.

In at least one embodiment, determining at 602 whether an OTAP update is available involves determining that the OTAP update has been received from a network-side entity such as the network-side infrastructure 502 via a wireless data connection such as the wireless data connection 504. Such an operation may involve receiving an indication from the DMM 508 that it has received a downloaded update. And other possibilities exist as well.

The update-ready indication of 610 could involve one or more of a visible indication, an audible indication, and a tactile indication, perhaps presented via the alert interface 234, perhaps by flashing the check-transmission light. Such would essentially be a one-way signal from the TCM 102 to an operator in a limited-interface environment.

Further to the discussion of embodiments involving limited operator-interface capabilities, the processing at 614 as to whether a valid initiate-update instruction has been received by the TCM 102 via the operator interface 228 could involve receiving a given sequence of shift-selector-position inputs; comparing the received sequence of shift-selector-position inputs to a prestored sequence of shift-selector-position inputs; determining that the first precondition is satisfied if the given sequence of shift-selector-position inputs matches the prestored sequence of shift-selector-position inputs; and determining that the first precondition is not satisfied if the given sequence of shift-selector-position inputs does not match the prestored sequence of shift-selector-position inputs.

Such shift-selector inputs could be enterable by positioning the shift selector 232 in a given position for less than a threshold amount of time and then proceeding to the next shift-selector input in the sequence. In an embodiment, a valid initiate-update instruction is made up of a sequence of inputs that a driver would be quite unlikely to randomly enter. One suggestion is the sequence N-D-N-D-N-R-N-R-N-D-N-D-N. And again, if the shift selector 232 is left in a given position for too long, the pattern would have to be restarted (i.e., it would be determined that a valid initiate-update instruction had not been received). But if the shift selector 232 is steadily moved between positions in the correct (i.e., matching) pattern, it is determined that a valid initiate-update instruction has been received. In an embodiment, the TCM 102 provides an indication to the operator (via either a display, by flashing the check-transmission light, and/or some other option) after an update has successfully completed installation. In some embodiments, the absence of that indicator indicates failure; in other embodiments, a separate, different indicator is used to indicate installation failure.

Moreover, in some embodiments, the TCM 102 permits the driver to modify what is considered a valid initiate-update instruction via suitable sequences of inputs. That is, the initiate-update instruction is customizable in some embodiments. In some cases, what is considered a valid initiate-update instruction is modifiable via the operator interface 228. In some cases, what is considered a valid initiate-update instruction is modifiable via a wireless message from the network side. In some cases, neither is an option. In some cases, both options are implemented.

In embodiments that feature a touchscreen, the TCM may simply send a CAN message to the touchscreen to inform the user that an update is ready. The touchscreen interface may then guide the operator through various steps such as putting the vehicle in the PARK state, and so forth. The user may then be prompted on the touchscreen to confirm that the installation should proceed, which it then does if such a confirmation input is received. Notifications of installation success or failure can then be presented to the user via the touchscreen. Moreover, in connection with any embodiments, alerts (e.g., e-mails, texts, and/or the like) could be sent to one or more computers, mobile devices, and the like to alert various different personnel of the status of a given update. Current configuration settings, installation version, and so forth could also be communicated in those alerts and/or in separate messages.

c. Second Example Method

Figure 8:
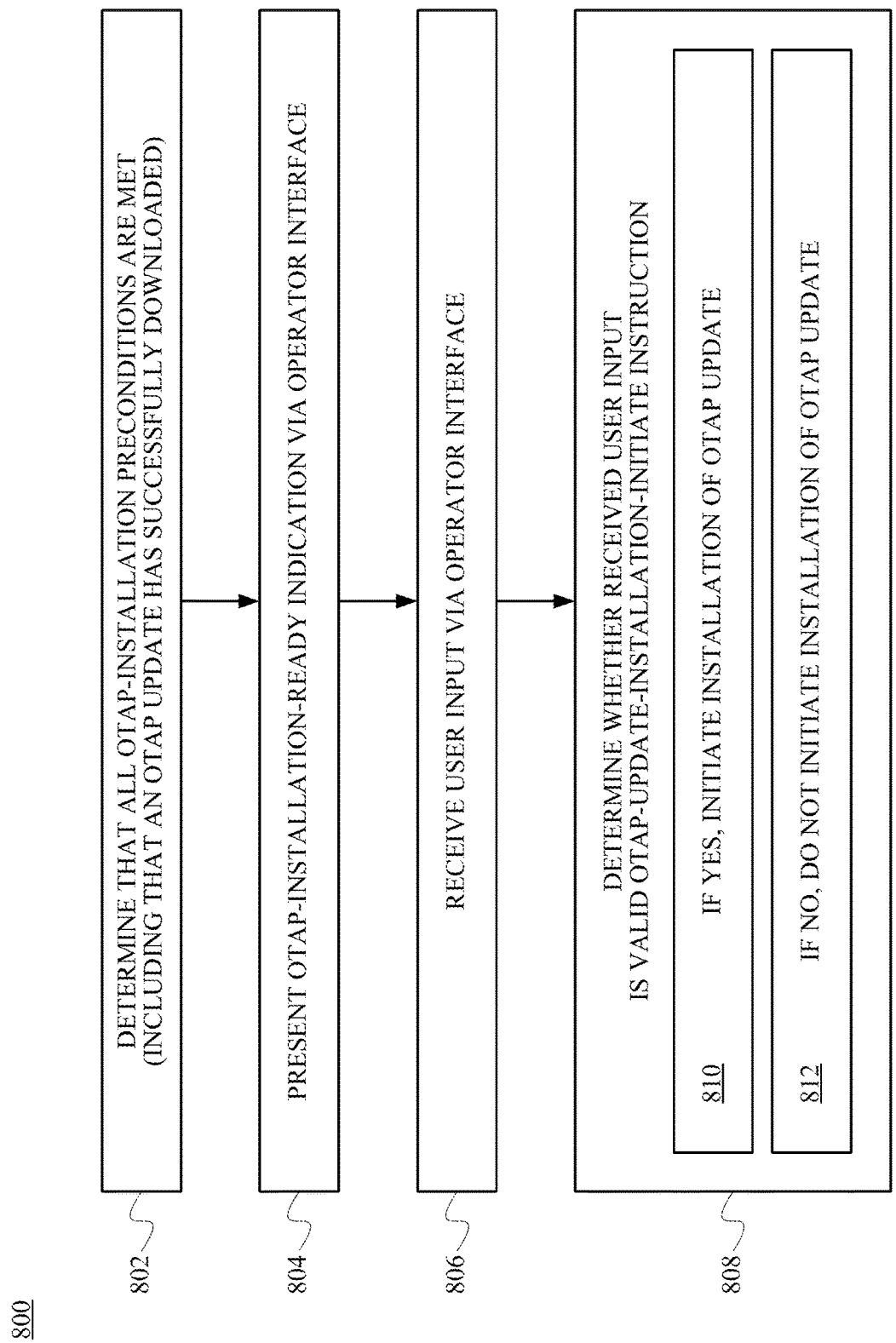
FIG. 8 depicts a second example method, in accordance with at least one embodiment.

FIG. 8 depicts a second example method 800 that may be carried out by a TCM such as the TCM 102 or by another suitable device, similar to the method 600. Due to similarities between some aspects of the methods 600 and 800, the method 800 is not described in as great of detail. One difference between the two methods is that, unlike the processing that occurs in connection with the method 600, the processing that occurs in connection with the method 800 involves determining that all preconditions in a set of one or more preconditions are met before even notifying the driver via the operator interface 228 that an update is available. In these embodiments, that set of one or more preconditions includes a precondition that the update has been successfully downloaded to the vehicle 202, and may include zero, one, or more than one further preconditions.

At 802, the TCM 102 determines that each precondition in a set of one or more preconditions is satisfied, where that set of one or more preconditions includes a first precondition that an OTAP update has been successfully downloaded to the TCM. At 804, the TCM 102 responsively presents an update-ready indication via the operator interface 228. At 806, after presenting the update-ready indication, the TCM 102 receives an input via the operator interface 228. At 808, the TCM 102 responsively determines whether that received input is a valid initiate-update instruction. At 810, if the TCM 102 determines at 808 that the received input is a valid initiate-update instruction, the TCM 102 then responsively initiates installation of the OTAP update. At 812, if the TCM 102 determines at 808 that the received input is not a valid initiate-update instruction, the TCM 102 then responsively does not initiate installation of the OTAP update.

An embodiment takes the form of an onboard system of a vehicle, where the onboard system includes a TCM having a communication interface; a processor; and a non-transitory CRM containing instructions executable by the processor for causing the TCM to carry out the method 800.

d. Third Example Method

Figure 9:
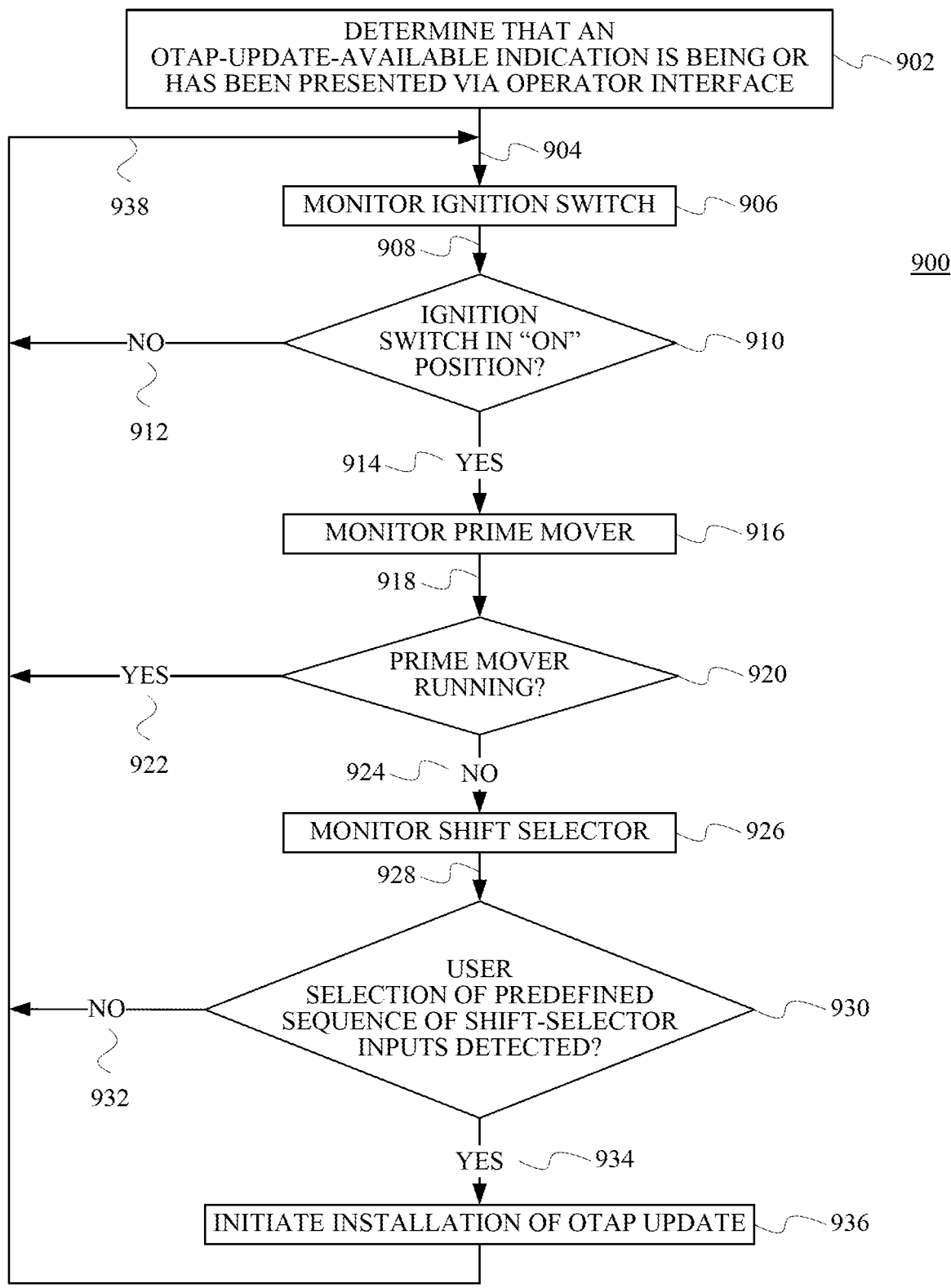
FIG. 9 depicts a third example method, in accordance with at least one embodiment.

FIG. 9 depicts a third example method 900 that may be carried out by a TCM such as the TCM 102 or by another suitable device, similar to the method 600. Due to similarities between some aspects of the methods 600, 800, and 900, the method 900 is not described in as great of detail. In general, the method 900 is focused on a context in which there is a limited operator interface 228 such that input via the shift selector 232 is involved, and in which exactly three preconditions must be satisfied to trigger installation of the OTAP update. These three preconditions are that the ignition switch 230 is in its ON position, the prime mover 204 is in its NOT-RUNNING state, and a correct sequence of shift-selector inputs is received via the shift selector 232 of the operator interface 228.

At 902, the TCM determines that an OTAP-update-available indication is being or has been presented via the operator interface 228, where the OTAP-update-available indication indicates that an OTAP update is available for installation.

The TCM 102 proceeds at 904 to monitor the ignition switch 230 and at 908 proceeds to 910 to determine whether the ignition switch 230 is in its ON position. If not, the TCM 102 proceeds at 912 to path 938 back to 906. If so, the TCM proceeds at 914 to monitor the prime mover 204 at 916 and proceeds at 918 to 920 to determine whether the prime mover 204 is in its RUNNING state. If so, the TCM 102 proceeds at 922 to the path 938 back to 906. If not, the TCM 102 proceeds at 924 to 926 to monitor the shift selector 232 and at 928 to determine at 930 whether a predefined sequence of shift-selector inputs is received from the shift selector 232, and responsively initiating installation of the OTAP update.

If the TCM 102 determines at 930 that the predefined sequence of shift-selector inputs has not been received from the shift selector 232, the TCM 102 then proceeds at 932 to path 938 back to 906. If, however, the TCM 102 determines at 930 that the predefined sequence of shift-selector inputs has been received from the shift selector 232, the TCM 102 proceeds at 934 to 936, where the TCM 102 initiates installation of the OTAP update, and then proceeds on the path 938 back to 906. In some embodiments, an additional decision box is present and relates to detecting whether installation of the update has been canceled and/or failed for some other reason; if that is determined to be the case, a return path from that decision box may bring processing back to 902. And certainly other variations could be listed here as well.

An embodiment takes the form of an onboard system that includes a communication interface; a processor; and a non-transitory CRM containing instructions executable by the processor for causing the onboard system to carry out the method 900.

V. Incorporation By Reference

Each of the below-listed U.S. patent documents is hereby incorporated herein by reference in its respective entirety. It is further noted that similar though differently numbered and perhaps slightly differently named components (e.g., transmissions, shifters and shift selectors, and the like) are described in the present disclosure and also in one or more of the incorporated documents. It is explicitly contemplated that, other than any conflicts that one of skill in the art would realize would be unworkable, the various permutations (e.g., a transmission operating according to a planetary gear set) that are disclosed with respect to these similar elements could be implemented in connection with the present systems and methods.

- U.S. Pat. No. 7,499,784, entitled "Method of Selecting a Transmission Shift Schedule," issued Mar. 3, 2009 from U.S. patent application Ser. No. 11/733,164, filed Apr. 9, 2007;
- U.S. Pat. No. 8,000,864, entitled "System and Method for Changing Values Stored in Memory that Relate to the Operation of an Automatic Transmission," issued Aug. 16, 2011 from U.S. patent application Ser. No. 12/035, 946, filed Feb. 22, 2008;
- U.S. Pat. No. 8,170,758, entitled "System and Method for Changing Values Stored in Memory that Relate to the Operation of an Automatic Transmission," issued May 1, 2012 from U.S. patent application Ser. No. 13/190, 644, filed Jul. 26, 2011;
- U.S. Pat. No. 8,332,108, entitled "System for Determining a Vehicle Mass-Based Breakpoint for Selecting Between Two Different Transmission Shift Schedules," issued Dec. 11, 2012 from U.S. patent application Ser. No. 12/455,369, filed Jun. 1, 2009;
- U.S. Pat. No. 8,935,068, entitled "System and Method for Optimizing Downshifting of a Transmission During Vehicle Deceleration," issued Jan. 13, 2005 from U.S. patent application Ser. No. 13/920,168, filed Jun. 18, 2013;
- U.S. Pat. No. 9,365,201, entitled "Device, System, and Method for Controlling Transmission Torque to Provide Hill Ascent and/or Descent Assistance Using Road Grade," issued Jun. 14, 2016 from U.S. patent application Ser. No. 13/835,331, filed Mar. 15, 2013;
- U.S. Pat. No. 9,512,905, entitled "Multi-Speed Transmission," issued Dec. 6, 2016 from U.S. patent application Ser. No. 14/918,804, filed Oct. 21, 2015;
- U.S. Pat. No. 9,518,638, entitled "Multi-Speed Transmission" and issued Dec. 13, 2016 from U.S. patent application Ser. No. 14/919,864, filed Oct. 22, 2015;
- U.S. Pat. No. 9,541,168, entitled "Multi-Speed Transmission," issued Jan. 10, 2017 from U.S. patent application Ser. No. 14/919,878, filed Oct. 22, 2015;
- U.S. Pat. No. 9,625,007, entitled "Multi-Speed Transmission," issued Apr. 18, 2017 from U.S. patent application Ser. No. 14/457,592, filed Aug. 12, 2014;
- U.S. Pat. No. 9,631,707; entitled "Multi-Speed Transmission," issued Apr. 25, 2017 from U.S. patent application Ser. No. 14/919,827, filed Oct. 22, 2015;
- U.S. Pat. No. 9,726,256, entitled "Multi-Speed Transmission," issued Aug. 8, 2017 from U.S. patent application Ser. No. 14/919,851, filed Oct. 22, 2015;
- U.S. Patent Application Publication No. 2015/0292615, entitled "System and Method for Automatic Neutral and Automatic Return-to-Range for use with an Automatic Transmission," published Oct. 15, 2015 from U.S. patent application Ser. No. 14/251,283, filed Apr. 11, 2014;
- U.S. Patent Application Publication No. 2016/0025213, entitled "Method of Setting Transmission Shift Points in Real-Time Based Upon an Engine Performance Curve," published Jan. 28, 2016 from U.S. patent application Ser. No. 14/875,753, filed Oct. 6, 2015;
- U.S. Patent Application Publication No. 2016/0040754, entitled "Multi-Speed Transmission," published Feb. 11, 2016 from U.S. patent application Ser. No. 14/453, 660, filed Aug. 7, 2014;
- U.S. Patent Application Publication No. 2016/0138680, entitled "Multi-Speed Transmission," published May 19, 2016 from U.S. patent application Ser. No. 15/003, 089, filed Jan. 21, 2016;
- U.S. Patent Application Publication No. 2016/0138681, entitled "Multi-Speed Transmission," published May 19, 2016 from U.S. patent application Ser. No. 15/003, 112, filed Jan. 21, 2016;
- U.S. Patent Application Publication No. 2016/0138682, entitled "Multi-Speed Transmission," published May 19, 2016 from U.S. patent application Ser. No. 15/003, 149, filed Jan. 21, 2016; and
- U.S. Patent Application Publication No. 2018/0031119, entitled "Manual Shifting Control System and Method for Multi-Speed Automatic Transmission," published Feb. 1, 2018 from U.S. patent application Ser. No. 15/220,803, filed Jul. 27, 2016.

The invention claimed is:

1. An onboard system of a vehicle, the onboard system comprising:
 a transmission control module (TCM) comprising a communication interface, a processor, and a non-transitory computer-readable medium containing instructions executable by the processor for causing the TCM to carry out a set of TCM functions including:
  determining that an over-the-air-programming (OTAP) update of the TCM is available, and responsively presenting an update-ready indication via an operator interface of the vehicle, the operator interface being physically coupled to the TCM, and the presenting the update-ready indication comprising flashing a check-transmission light of the operator interface;
  after presenting the update-ready indication, determining whether each precondition in a set of one or more preconditions is satisfied, the set of one or more preconditions including a first precondition that a valid initiate-update instruction has been received via the operator interface;

only if the TCM determines, after presenting the update-ready indication, that each precondition in the set of one or more preconditions is satisfied including the first precondition that the valid initiate-update instruction has been received via the operator interface that is physically coupled to the TCM, the TCM then responsively initiating installation of the OTAP update; and if the TCM determines that at least one precondition in the set of one or more preconditions is not satisfied, the TCM then responsively not initiating installation of the OTAP update, the TCM will only initiate installation of the OTAP update after the valid initiate-update instruction has been received via the operator interface that is physically coupled to the TCM.

2. The onboard system of claim 1, wherein the OTAP update includes an update to firmware of the TCM.

3. The onboard system of claim 1, wherein the OTAP update includes an update to software of the TCM.

4. The onboard system of claim 1, wherein the OTAP update includes an update to one or more configuration settings of the TCM.

5. The onboard system of claim 1, wherein determining that the OTAP update is available comprises receiving the OTAP update from a network-side entity via a wireless data connection.

6. The onboard system of claim 1, wherein the update-ready indication further comprises one or more of an audible indication, and a tactile indication.

7. The onboard system of claim 1, wherein:
the operator interface comprises an ignition switch having at least an OFF position and an ON position;
the set of TCM functions further includes monitoring a current position of the ignition switch; and
the set of one or more preconditions further includes a second precondition that the current position of the ignition switch is the ON position.

8. The onboard system of claim 7, wherein:
the vehicle further comprises a prime mover having at least a RUNNING state and a NOT-RUNNING state;
the set of TCM functions further includes monitoring a current state of the prime mover; and
the set of one or more preconditions further includes a third precondition that the current state of the prime mover is the NOT-RUNNING state.

9. The onboard system of claim 1, wherein:
the vehicle further comprises a prime mover having at least a RUNNING state and a NOT-RUNNING state;
the set of TCM functions further includes monitoring a current state of the prime mover; and
the set of one or more preconditions further includes a second precondition that the current state of the prime mover is the NOT-RUNNING state.

10. The onboard system of claim 1, wherein:
the operator interface comprises a shift selector having a plurality of shift-selector positions;
the set of TCM functions further includes monitoring for receipt of any sequences of shift-selector-position inputs via the operator interface; and
determining whether the first precondition is satisfied comprises:
receiving a given sequence of shift-selector-position inputs;

comparing the received sequence of shift-selector-position inputs to a prestored sequence of shift-selector-position inputs;
determining that the first precondition is satisfied if the given sequence of shift-selector-position inputs matches the prestored sequence of shift-selector-position inputs; and
determining that the first precondition is not satisfied if the given sequence of shift-selector-position inputs does not match the prestored sequence of shift-selector-position inputs.

11. The onboard system of claim 10, wherein the set of TCM functions further includes receiving a change-prestored-sequence instruction to replace the prestored sequence of shift-selector-position inputs with a different sequence of shift-selector-position inputs, and responsively replacing the prestored sequence with the different sequence.

12. The onboard system of claim 11, wherein receiving the change-prestored-sequence instruction comprises receiving the change-prestored-sequence instruction via the operator interface.

13. The onboard system of claim 11, wherein receiving the change-prestored-sequence instruction comprises receiving the change-prestored-sequence instruction from a network-side entity via a wireless data connection.

14. The onboard system of claim 1, wherein:
the operator interface comprises a touchscreen; and
determining whether the first precondition is satisfied comprises:
determining that the first precondition is satisfied if a confirmation input associated with the presented update-ready indication is received via the operator interface; and
determining that the first precondition is not satisfied if a confirmation input associated with the presented update-ready indication is not received via the operator interface.

15. The onboard system of claim 1, wherein the set of TCM functions further includes determining that the OTAP update has been successfully installed, and responsively presenting via the operator interface an indication of successful installation.

16. The onboard system of claim 15, wherein presenting the indication of successful installation comprises flashing the check-transmission light of the operator interface.

17. A method comprising:
a transmission control module (TCM) of a vehicle determining that an over-the-air-programming (OTAP) update of the TCM is available, and responsively presenting an update-ready indication via an operator interface of the vehicle, the operator interface comprising a shift selector, and the presenting the update-ready indication comprising flashing a check-transmission light of the operator interface;
the TCM, after presenting the update-ready indication, determining whether each precondition in a set of one or more preconditions is satisfied, the set of one or more preconditions including a first precondition that a valid initiate-update instruction has been received via the shift selector of the operator interface;
if the TCM determines, after receiving the valid initiate-update instruction, that each precondition in the set including the first precondition is satisfied, the TCM then responsively initiating installation of the OTAP update; and if the TCM determines that at least one precondition in the set is not satisfied, the TCM then responsively not initiating installation of the OTAP update, the TCM will only initiate installation of the OTAP after receiving the valid initiate-update instruction via the shift selector.

18. An onboard system of a vehicle, the onboard system comprising:
a transmission control module (TCM) comprising a communication interface, a processor, and a non-transitory computer-readable medium containing instructions executable by the processor for causing the TCM to carry out a set of TCM functions including:
determining that each precondition in a set of one or more preconditions is satisfied, the set of one or more preconditions including that an over-the-air-programming (OTAP) update of the TCM has been successfully downloaded to the TCM, and responsively presenting an update-ready indication via an operator interface of the vehicle, the operator interface being integral to the vehicle, and the presenting the update-ready indication comprising flashing a check-transmission light of the operator interface;
after presenting the update-ready indication, receiving an input via the operator interface and responsively determining whether the received input is a valid initiate-update instruction;
only if the TCM determines that the received input is a valid initiate-update instruction will the TCM then responsively initiating installation of the OTAP update; and
otherwise the TCM then responsively not initiating installation of the OTAP update, the TCM will only initiate installation of the OTAP update when the received input is a valid initiate-update instruction received via the operator interface that is integral to the vehicle.

19. The onboard system of claim 18, wherein:
the operator interface comprises an ignition switch having at least an OFF position and an ON position;
the set of TCM functions further includes monitoring a current position of the ignition switch; and
the set of one or more preconditions further includes a second precondition that the current position of the ignition switch is the ON position.

20. The onboard system of claim 19, wherein:
the vehicle further comprises a prime mover having at least a RUNNING state and a NOT-RUNNING state;
the set of TCM functions further includes monitoring a current state of the prime mover; and
the set of one or more preconditions further includes a third precondition that the current state of the prime mover is the NOT-RUNNING state.

21. The onboard system of claim 18, wherein:
the vehicle further comprises a prime mover having at least a RUNNING state and a NOT-RUNNING state;
the set of TCM functions further includes monitoring a current state of the prime mover; and
the set of one or more preconditions further includes a second precondition that the current state of the prime mover is the NOT-RUNNING state.

22. The onboard system of claim 18, wherein:
the operator interface comprises a shift selector having a plurality of shift-selector positions;
the set of TCM functions further includes monitoring for receipt of any sequences of shift-selector-position inputs via the operator interface; and
determining whether the received input is a valid initiate-update instruction comprises:
receiving a given sequence of shift-selector-position inputs;
comparing the received sequence of shift-selector-position inputs to a prestored sequence of shift-selector-position inputs;
determining that the received input is a valid initiate-update instruction if the given sequence of shift-selector-position inputs matches the prestored sequence of shift-selector-position inputs; and
determining that the received input is not a valid initiate-update instruction if the given sequence of shift-selector-position inputs does not match the prestored sequence of shift-selector-position inputs.

23. The onboard system of claim 18, wherein:
the operator interface comprises a touchscreen; and
determining whether the received input is a valid initiate-update instruction comprises:
determining that the received input is a valid initiate-update instruction if a confirmation input associated with the presented update-ready indication is received via the operator interface; and
determining that the received input is not a valid initiate-update instruction if a confirmation input associated with the presented update-ready indication is not received via the operator interface.

24. An onboard system of a vehicle, the onboard system comprising:
a transmission control module (TCM) comprising a communication interface, a processor, and a non-transitory computer-readable medium containing instructions executable by the processor for causing the TCM to carry out a set of TCM functions including:
determining that an over-the-air-programming (OTAP) update of the TCM is available, and responsively presenting an update-ready indication via an operator interface of the vehicle, the operator interface being physically coupled to the TCM;
after presenting the update-ready indication, determining whether each precondition in a set of one or more preconditions is satisfied, the set of one or more preconditions including a first precondition that a valid initiate-update instruction has been received via the operator interface;
only if the TCM determines, after presenting the update-ready indication, that each precondition in the set of one or more preconditions is satisfied including the first precondition that the valid initiate-update instruction has been received via the operator interface that is physically coupled to the TCM, the TCM then responsively initiating installation of the OTAP update;
if the TCM determines that at least one precondition in the set of one or more preconditions is not satisfied, the TCM then responsively not initiating installation of the OTAP update, the TCM will only initiate installation of the OTAP update after the valid initiate-update instruction has been received via the operator interface that is physically coupled to the TCM; and
determining that the OTAP update has been successfully installed, and responsively presenting via the operator interface an indication of successful installation, wherein presenting the indication of successful installation comprises flashing a check-transmission light of the operator interface.

* * * * *